Sept. 17, 1968    R. J. PINGREE    3,401,988
CENTERING AND STABILIZING MEANS FOR A PIPELINE
TRAVERSING MACHINE
Filed Feb. 8, 1966    2 Sheets-Sheet 2
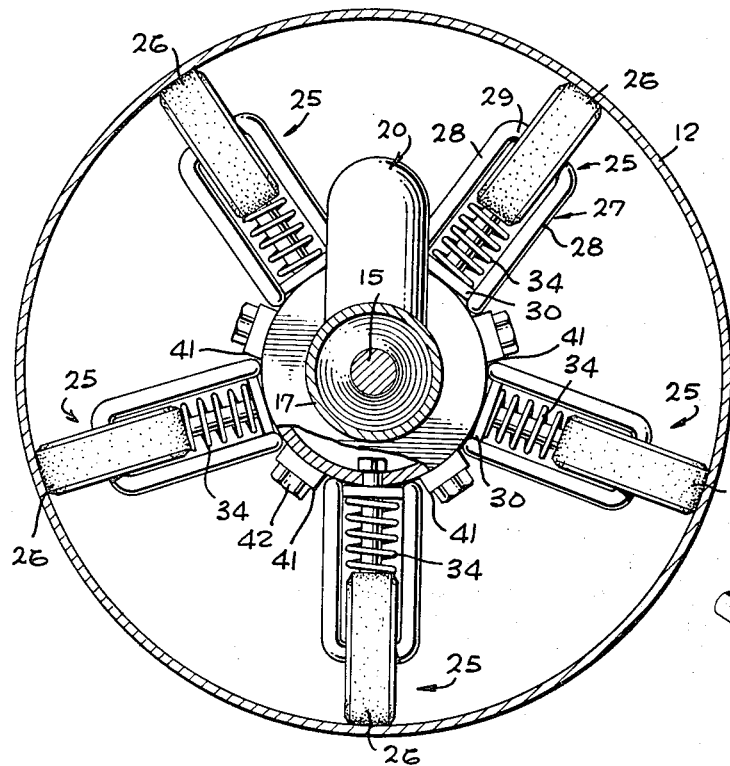
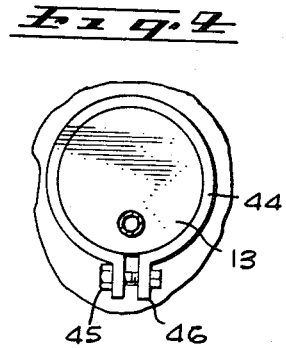
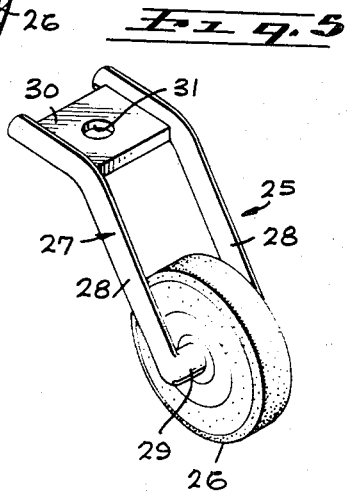
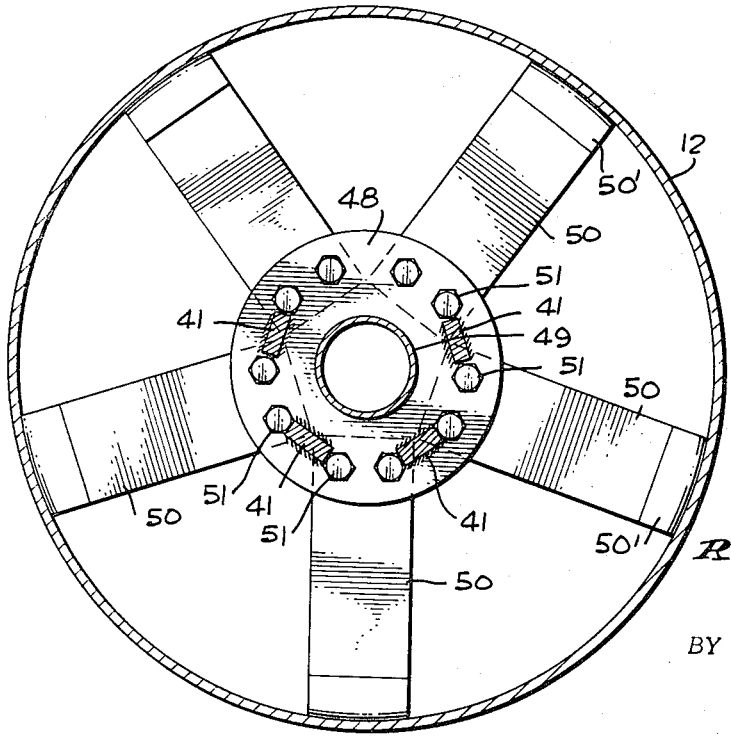
ROBERT J. PINGREE
INVENTOR.
BY
Mason & Graham
ATTORNEYS 3,401,988
CENTERING AND STABILIZING MEANS FOR A PIPELINE TRAVERSING MACHINE
Robert J. Pingree, Torrance, Calif., assignor to American Pipe and Construction Co., Monterey Park, Calif., a corporation of California
Filed Feb. 8, 1966, Ser. No. 525,879
7 Claims. (Cl. 308—4)

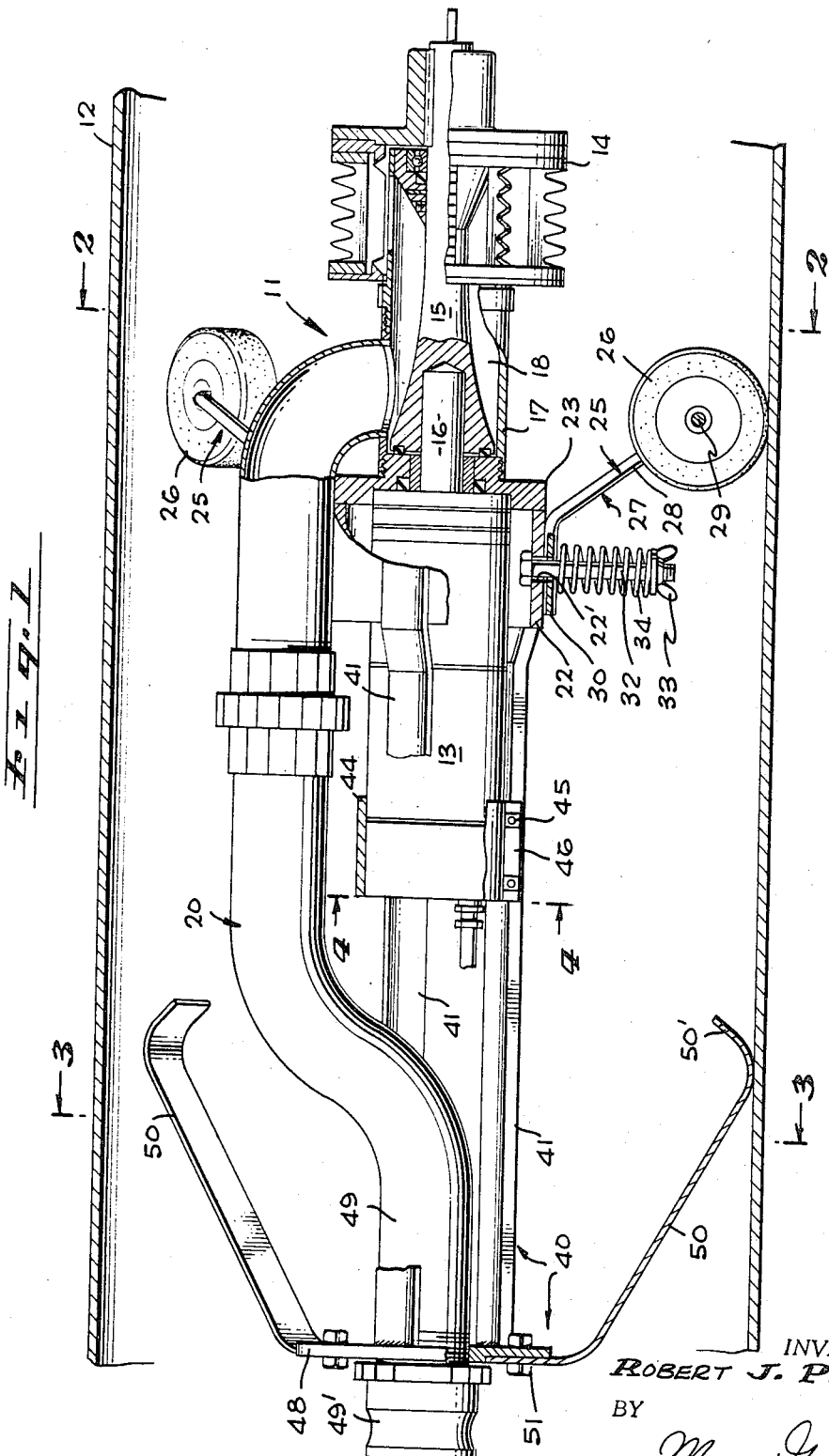

ABSTRACT OF THE DISCLOSURE

The application discloses an assembly of spring-mounted rockable arms carrying rollers for supporting a pipelining machine or the like centrally of the pipe as it traverses the same and in combination therewith a framework and spring arms for further supporting the machine in the pipe.

---

This invention has to do generally with devices which traverse pipelines, such as pipelining machines which apply a coating of mortar to the inner wall of the pipeline, and more particularly to apparatus for centering, stabilizing, and guiding such machines and devices as they are moved through the pipe.

An object of the invention is to provide a new and improved guide means for centering and stabilizing a pipeline traversing device or machine, such as a pipelining machine, in a pipeline to hold it centered and reasonably steady in its movement through the pipeline.

Another object is to provide a relatively simple, inexpensive, easily manufactured and maintained means for centering and stabilizing a pipe traversing tool or machine.

A further object is to provide a guide means of the type indicated which can be readily attached to a tool or machine and easily removed therefrom when necessary.

These and other objects will be apparent from the drawings and the following description. Referring to the drawings:

FIG. 1 is a longitudinal sectional view, partly in elevation, of a pipelining machine equipped with the centering and stabilizing means of the invention;

FIGS. 2, 3, and 4 are cross-sectional views on lines 2—2, 3—3, and 4—4, respectively, of FIG. 1; and FIG. 5 is an isometric view of one wheel bracket assembly.

More particularly describing the invention, numeral 11 generally designates a machine of the centrifugal type for lining a pipeline 12 with cement mortar. In general the machine has a motor 13 which serves to rotate or drive a distributor head 14 mounted on the end of a shaft 15 which is in turn secured to the end of the motor shaft 16. The machine includes a casing 17 with a hollow interior 18 to receive the mortar (not shown) which is supplied through a conduit or mortar tube 20.

The centering and stabilizing means includes a bracket support ring 22 which is welded or otherwise mounted to a flange 23 of the machine. A plurality of guide wheel brackets 25 are secured to this ring and each bracket carries a wheel 26 for engagement with the inner surface of the pipeline. Each bracket comprises a rod-like member 27 bent to form two parallel legs 28 and a connecting section 29 upon which the wheel is journaled. A base plate 30 is welded between the free ends of the rod and this is provided with a hole 31 to receive a mounting bolt 32. The latter is received in a hole 22′ in ring 22 and is fitted with a nut, such as a wingnut 33 shown and a compression coil spring 34 is disposed between the outer surface of the base plate of the bracket and the wing nut which forms an abutment at the outer end of the bolt 32. It will be noted that the base of the bracket is disposed at an oblique angle with respect to the remainder thereof and consequently the brackets extend rearwardly and radially outward of the machine.

The springs 34 are sufficiently strong to carry the weight of the machine and depending upon the size of the equipment, as many brackets as needed may be provided around the machine. The bolts 32 do not fit tightly in holes 22 and 31 and hence it will be apparent that the springs serve to allow the wheels to move inward somewhat against the force of the springs and thus permit the wheels to pass over obstructions in the pipeline. The springs also of course yieldably urge the wheels outwardly into engagement with the pipe wall and in this connection the brackets are so chosen as to size that the wheels will be forced inwardly somewhat from the normal position shown when the device is inserted in the pipeline.

The centering and stabilizing means further includes an assembly 40 which comprises a plurality of rods or bars 41, the rear ends of which are attached to the bracket support ring 22 by bolts 42. Intermediate their ends the bars are provided with a clamp ring 44 which is adapted to be secured to the machine by bolts 45 through flanges 46 of the ring. The rods extend generally axially of the machine and are spaced circumferentially as seen in FIGS. 2 and 3, the two uppermost rods being widely spaced to accommodate the conduit 20 which is formed to provide a forward section 49 on the axis of the machine 11. This section terminates in a coupling fitting 49′.

At their forward ends the bars 41 are provided with an annular mounting ring or flange 48 which is welded or otherwise secured thereto. The mounting ring receives the conduit section 49 and serves to support it by means of a plurality of guide springs 50 which are secured to the ring in circumferentially spaced relation by bolts 51. The springs extend radially outwardly and rearwardly of their inner ends and may have inturned end sections 50′.

It will be apparent that the guide means, in addition to serving its function of centering and stabilizing a tool or machine in a pipeline, also is so constructed and arranged that it can be readily disassembled as required for the attachment of different sized guide means, or for the repair or replacement of parts.

Although I have illustrated and described a preferred form of my invention, I contemplate that various changes and modifications can be made therein without departing from the invention, the scope of which is indicated by the following claims.

I claim:
1. Guide means for centering a pipe traversing machine within a pipeline comprising a bracket support mounted on said machine and extending substantially around a portion of the machine, a plurality of brackets mounted for rocking movement at their inner ends on said support in circumferentially spaced relation, said brackets extending rearwardly and radially outward of the machine, a wheel carried at the free outer end of each bracket, and spring means secured to said support and said brackets at only the inner end of said brackets permitting but resisting movement of the free ends of the brackets inwardly toward the longitudinal axis of the machine.

2. The guide means set forth in claim 1 in which each bracket includes an apertured base, in which a bolt secures said base to the support, and in which a coil spring is provided between an abutment on the bolt and the outer surface of the base of said bracket.

3. The guide means set forth in claim 2 in which each bracket comprises a wire rod bent to form two parallel legs with a connecting section at one end and the base at the other, said wheel being carried on the connecting section.

4. Guide means for centering a pipe traversing machine or the like in a pipeline in which the machine has an axially centered forward conduit section, comprising an encircling support member mounted on the machine, a plurality of wheel-carrying brackets resiliently mounted on said support member, a plurality of bars secured at their rear ends to said support member and extending axially thereof forward; an annular mounting flange secured to the forward ends of said bars and receiving said forward conduit section, and a plurality of guide springs mounted at their inner ends on said flange in circumferentially spaced relation and extending radially outward and rearwardly of their inner ends.

5. The guide means set forth in claim 4 in which a mounting ring is provided intermediate the ends of said bars and adapted to attach to said machine.

6. The guide means set forth in claim 4 in which said bars are detachably secured to said support member.

7. The guide means set forth in claim 4 in which each wheel-carrying bracket includes an apertured base, in which a bolt secures said base to the support, and in which a coil spring is provided between an abutment on the bolt and the outer surface of the base of said bracket.

References Cited

UNITED STATES PATENTS

| | | |
|---|---|---|
| 317,156 | 5/1885 | Lowrie. |
| 1,690,721 | 11/1928 | Dillon. |
| 3,037,228 | 6/1962 | Cummings _____ 118—306 X |

FREDERICK L. MATTESON, Jr., *Primary Examiner.*

R. A. DUA, *Assistant Examiner.*